United States Patent
Raszka et al.

(10) Patent No.: US 11,385,988 B2
(45) Date of Patent: Jul. 12, 2022

(54) SYSTEM AND METHOD TO IMPROVE RESULTS OF A STATIC CODE ANALYSIS BASED ON THE PROBABILITY OF A TRUE ERROR

(71) Applicant: PARASOFT CORPORATION, Monrovia, CA (US)

(72) Inventors: Leszek Jerzy Raszka, Czechowice Dziedzice (PL); Leonid Borodaev, The Hague (NL)

(73) Assignee: PARASOFT CORPORATION, Monrovia, CA (US)

( * ) Notice: Subject to any disclaimer, the term of this patent is extended or adjusted under 35 U.S.C. 154(b) by 204 days.

(21) Appl. No.: 16/936,311

(22) Filed: Jul. 22, 2020

(65) Prior Publication Data

US 2021/0117305 A1  Apr. 22, 2021

Related U.S. Application Data

(60) Provisional application No. 62/923,976, filed on Oct. 21, 2019.

(51) Int. Cl.
| | | |
|---|---|---|
| *G06F 11/00* | (2006.01) | |
| *G06F 11/36* | (2006.01) | |
| *G06N 3/08* | (2006.01) | |

(52) U.S. Cl.
CPC ........... *G06F 11/3608* (2013.01); *G06N 3/08* (2013.01)

(58) Field of Classification Search
CPC .............................. G06F 11/3608; G06N 3/08

USPC ........................................................ 714/1–57
See application file for complete search history.

(56) References Cited

U.S. PATENT DOCUMENTS

| | | | |
|---|---|---|---|
| 10,395,041 B1* | 8/2019 | Youngberg | G06F 21/563 |
| 2012/0167060 A1* | 6/2012 | Landwehr | G06F 11/3604 |
| | | | 717/131 |
| 2014/0082417 A1* | 3/2014 | Barton | G06F 11/0793 |
| | | | 714/26 |
| 2015/0089297 A1* | 3/2015 | Johnson | G06F 8/70 |
| | | | 714/38.1 |
| 2015/0317234 A1* | 11/2015 | Ligman | G06F 11/3612 |
| | | | 714/38.1 |
| 2016/0182558 A1* | 6/2016 | Tripp | G06F 21/562 |
| | | | 726/25 |
| 2017/0068612 A1* | 3/2017 | Herzig | G06F 11/3672 |
| 2017/0116519 A1* | 4/2017 | Johnson | G06F 16/35 |
| 2018/0219561 A1* | 8/2018 | Litsyn | H03M 13/2915 |
| 2019/0347209 A1* | 11/2019 | Seifert | G06F 12/0646 |
| 2020/0349052 A1* | 11/2020 | Wehr | G06N 3/0454 |

* cited by examiner

*Primary Examiner* — Sarai E Butler (74) *Attorney, Agent, or Firm* — Lewis Roca Rothgerber Christie LLP

(57) ABSTRACT

Computer-implemented method for improving the test results of a static code analyzer includes: receiving a plurality of test violations from the static code analyzer; constructing a first vector for each code snippet containing error candidates; constructing a second vector for each test violation from meta-data associated with said each test violation; merging the first vector with the second vector to produce a feature vector for each test violation; and applying statistical learning techniques to each feature vector to estimate a probability that an error candidate in the plurality of test violations is a true error or a false positive.

15 Claims, 7 Drawing Sheets

| Violation Id | Metadata | | | | | |
|---|---|---|---|---|---|---|
| Viol 1 | BD-PB-NP | FA | 1 | pscom_nightly | BD-PB | John |
| Viol 2 | BD-PB-NP | FA | 1 | eclipsedriver_nightly | BD-PB | Mike |
| Viol 3 | BD-PB-DEREF | FA | 2 | eclipsedriver_nightly | BD-PB | Pablo |
| Viol 4 | INIT-06 | CS | 1 | pscom_nightly | INIT | Mike |
| Viol 5 | BD-PB-NP | FA | 1 | eclipsedriver_nightly | BD-PB | Mike |

Factorization

| Violation Id | Factorized Metadata | | | | | |
|---|---|---|---|---|---|---|
| Viol 1 | 1 | 1 | 1 | 1 | 1 | 1 |
| Viol 2 | 1 | 1 | 1 | 2 | 1 | 2 |
| Viol 3 | 2 | 1 | 2 | 2 | 1 | 3 |
| Viol 4 | 3 | 2 | 1 | 1 | 2 | 2 |
| Viol 5 | 1 | 1 | 1 | 2 | 1 | 2 |

SYSTEM AND METHOD TO IMPROVE RESULTS OF A STATIC CODE ANALYSIS BASED ON THE PROBABILITY OF A TRUE ERROR

CROSS-REFERENCE TO RELATED APPLICATIONS

This Patent Application claims the benefits of U.S. Provisional Patent Application Ser. No. 62/923,976, filed on Oct. 21, 2019 and entitled "Method to Categorize Results of a Static Code Analysis Based on the Probability of The Results Indicating a True Error," the entire content of which is hereby expressly incorporated by reference.

FIELD OF THE INVENTION

The disclosed invention relates generally to machine learning software; and more particularly to a system and method for using static analysis features combined with code representation features related to test violations to further analyze and improve the test violations.

BACKGROUND

Static code analysis is computerized analysis of a computer program that is performed without executing the program under test. A static code analysis tool (software) attempts to find errors of a certain type in the program, or prove the absence thereof, by studying the source code of the program. The information obtained from static analysis include highlighting possible coding errors to formal methods that mathematically prove properties about a given program, for example, whether the behavior of the program matches that of its specification. Software metrics are a form of static analysis. Deriving software metrics and static analysis are increasingly deployed together, especially in creation of embedded systems, by defining software quality objectives.

However, by its nature, static code analysis is bound to produce a number of findings that actually don't designate any true errors in the program under test. The proportion of false alarms depends vastly on the soundness of the static analyzer. Sound static analyzers report all lines of code for which the correctness can't be proven. Unsound static analyzers only report lines of code for which a presence of violation of the rule for which the program is analyzed can be proven. Most tools, however, fall somewhere in between those two extremes, and their soundness level can sometimes be configured and is usually different for every rule for which the program is scanned. These findings, which are traditionally referred to as false positives violations, hinder the progress of the development or testing team and become a major obstacle in the adoption of the static code analysis into the software development practice.

Some previous attempts to use machine learning for filtering the static code analysis results have been mostly limited to using various source code metrics such as the number of 'if' statements or 'for' statements as an input. Other previous approaches are based on combining various source code metrics vectors with the vectors constructed from the results of running multiple static analysis tools, where their labels are gathered by presenting the results of the static code analysis tools to a human expert for a review.

In contrast, the disclosed approach is based on combination of usage of a language model together with violation's meta-data (e.g., author, git branch, creation date, module, etc.).

SUMMARY

In some embodiments, the disclosed invention is a computer-implemented method for improving the test results of a static code analyzer. The method includes: receiving a plurality of test violations from the static code analyzer; for each test violation received from the static code analyzer, encoding a function or method in which said each test violation is identified into a first vector; factorizing and transforming meta data for said each test violation into a second vector; concatenating the first vector with the second vector to produce a single feature vector for said each test violation; randomly selecting a predetermined number of test violations from the plurality of test violations; analyzing the selected test violations to determine whether they are true errors or false positives; using feature vectors of results of analyzing the selected test violations as an input to a machine learning engine to produce a regressor; and obtaining probabilities of being a false positive or a true error, for every one of remaining test violations that have not been analyzed.

In some embodiments, the disclosed invention is a computer-implemented method for improving the test results of a static code analyzer. The method includes: receiving a plurality of test violations from the static code analyzer; constructing a first vector for each code snippet containing error candidates; constructing a second vector for each test violation from meta-data associated with said each test violation; merging the first vector with the second vector to produce a feature vector for each test violation; and applying statistical learning techniques to each feature vector to estimate a probability that an error candidate in the plurality of test violations is a true error or a false positive.

In some embodiments, the disclosed invention is a non-transitory computer storage medium for improving the test results of a static code analyzer having stored thereon a plurality of programing instructions that when executed by a computer perform: receiving a plurality of test violations from the static code analyzer; constructing a first vector for each code snippet containing error candidates; constructing a second vector for each test violation from meta-data associated with said each test violation; merging the first vector with the second vector to produce a feature vector for each test violation; and applying statistical learning techniques to each feature vector to estimate a probability that an error candidate in the plurality of In some embodiments, encoding a function or method into a vector is performed using a bag of words (BOW) method, a term frequency-inverse document frequency (TF-IDF), or neural network-based models.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

DETAILED DESCRIPTION

In some embodiments, the disclosed invention is a system and method for determining a likelihood of the violations being false reports and categorizing the violations discovered during a static analysis of a program according to the likelihood of the violations being false reports. The disclosed invention constructs vectors for code snippets containing error candidates, merges the vectors with other vectors constructed from the meta-data associated with the violations, and applies statistical learning techniques to estimate the probability that an error candidate is a true error, based on the knowledge obtained from the findings with known true statuses.

For example, the disclosed invention improves the test results of a static code analyzer, by receiving a plurality of test violations from the static code analyzer and constructing a first vector for each code snippet containing error candidates; and a second vector for each test violation from meta-data associated with said each test violation. The disclosed invention then merges the first vector with the second vector to produce a feature vector for each test violation and applies statistical learning techniques (for example a learning machine) to each feature vector to estimate a probability that an error candidate in the plurality of test violations is a true error or a false positive.

In some embodiments, to help the development and testing teams focus on only the most important violations of the static code analysis tool, a categorization method is utilized that identifies the findings that are most likely to be true error reports and that are most likely to be false error reports. The proposed system works by presenting a small number of randomly selected violations from the entire list of findings and asking the user to review them. After the input from the user is collected, the system performs regression and prioritizes the remaining un-reviewed violations based on their likelihood of being a false positive or a true error. For example, the disclosed approach determines a likelihood of the violations being false reports and categorizing the violations discovered based on combination of usage of a language model together with violation's meta-data (e.g., author, git branch, creation date, module, etc.).

Figure 1A:
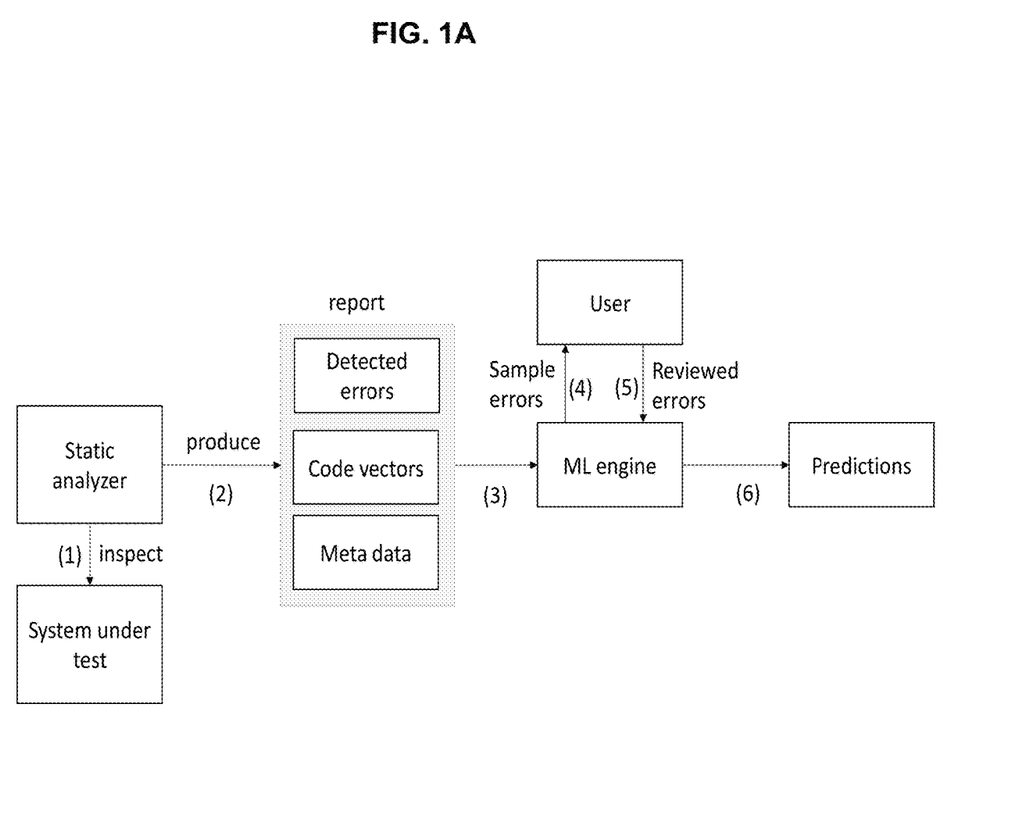
FIG. 1A illustrates an exemplary architecture of a system for using static analysis features combined with code representation features related to test violations to further analyze and improve the test violations, according to some embodiments of disclosed invention.

FIG. 1A illustrates an exemplary architecture of a system for using static analysis features combined with code representation features related to test violations to further analyze and improve the test violations, according to some embodiments of disclosed invention. As depicted, a static analyzer performs the analysis of the source code of a system under test (1), usually as a separate activity initiated by the developer, or as part of the process of building the executable code. The static analyzer takes the source code of the program and checks it for conformance to the set of rules for which it has been configured, and produces (2) a static analysis report. The static analysis report produced by the static analyzer includes detected errors (not necessarily all which are true errors), code vectors and meta data associated with every code snippet, which contains that error (e.g., author, branch, etc.). Table 1 demonstrates an example of meta-data in a static analysis report associated with a violation.

TABLE 1

| example of meta data for a violation | |
|---|---|
| Analysis type | FA |
| Description | Injection of data received from servlet request ("this") to Java reflection method |
| Finding author | modtest |
| Finding id | 77f0b01a-8370-3f0f-bc9d-c654f1ad1c94 |
| Finding region end line | 52 |
| Finding region end position | 98 |
| Finding region start line | 52 |
| Finding region start position | 8 |
| Finding resource hash | 1597438970 |
| Finding resource id | c1b76af8-5449-3ecf-88bf-eb3a2886997f |
| Finding resource module name | com.enonic.cms:cms-api |
| Finding resource module original id | com.enonic.cms:cms-api |
| Finding resource module path | /com.enonic.cms:cms-api |
| finding.resource.moduleRelativePath | src/main/java/com/enonic/cms/api/client/binrpc/BinRpcInvocation.java |
| finding.resource.path | src/main/java/com/enonic/cms/api/client/binrpc/BinRpcInvocation.java |
| finding.resource.searchPath | com.enonic.cms:cms-api/src/main/java/com/enonic/cms/api/client/binrpc/BinRpcInvocation.java |

TABLE 1-continued example of meta data for a violation

| | |
|---|---|
| finding.resource.unbranched Resource.id | 665cf3b2-7c2e-3f61-bf85-a8224f3ded34 |
| finding.status | failed |
| Id | a9f8bd2a-ff32-352f-87f6-eb4eb26ee77e |
| metadata.assignee | unknown |
| metadata.classification | Undefined |
| metadata.priority | Not Defined |
| metadata.violationAction | None |
| rule.analyzer.id | com.parasoft.jtest.flowanalyzer |
| rule.category.description | Security |
| rule.category.id | BD.SECURITY |
| rule.id | BD.SECURITY.TDRFL |
| Severity | 1 |
| unbranchedViolation.id | 2e73c596-9d68-3b35-91a7-6950b6c4db1d |

The report is then processed by an analysis engine, for example, a machine learning (ML) engine, which encodes the meta data into vectors and concatenates the vectors for methods with their meta data. In some embodiments, a random sample of a predetermined amount of violations is presented (4) to a user for a review. The user reviews violations and determines their true status as real error or not an error (5), to be used by the (ML) engine to perform machine learning. Subsequently, the ML engine uses user review as the ground truth to perform statistical learning and produces the predictions (6) of the likelihood of a certain violation being a true error for all the remaining errors in the report.

Figure 1B:
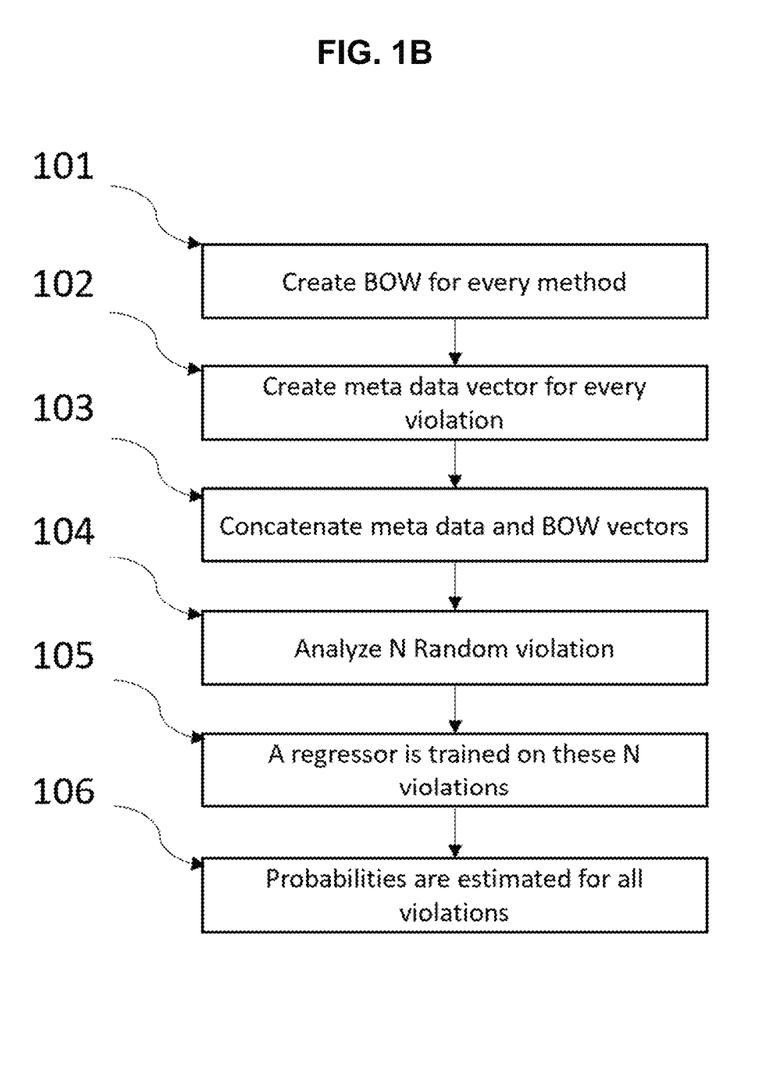
FIG. 1B illustrates an exemplary process for using static analysis features combined with code representation features related to test violations to further analyze and improve the test violations, according to some embodiments of disclosed invention.

FIG. 1B illustrates an exemplary process for using static analysis features combined with code representation features related to test violations to further analyze and improve the test violations, according to some embodiments of disclosed invention. As shown in block 101, for every violation from a static analysis, a function (method) in which this violation is found is encoded into a (first) vector, for example, by using a bag of words (BOW) algorithm/method. In the BOW, every word from the dictionary, which is obtained from the grammar of the language, is assigned a position in the vector to which the number of occurrences of its token (keyword) is written. In some embodiments, the encoding may be performed using a term frequency-inverse document frequency (TF-IDF), or neural network-based models. A TF-IDF is a known numerical statistic that is intended to reflect how important a word is to a document in a collection. In block 102, the meta data for the violation is factorized and transformed into its own (second) vector.

The two vectors are concatenated to create a single feature vector representation of the violation, in block 103. From the full list of violations, some (small) number of violations are randomly selected and presented to the user for a review. The violations are analyzed and determined whether they are true errors or false positives and assigned labels/flags accordingly, in block 104. The obtained labels are then used as an input for a machine learning algorithm/engine, such as random forest, to produce/train a regressor, in block 105. For every violation, a feature vector is obtained. The collection of these feature vectors (one for every violation) is used as an input to a ML algorithm. This regressor is used to obtain or estimate probabilities for every one of the un-reviewed (remaining) violations of being a false positive or a true error, in block 106.

Figure 2:
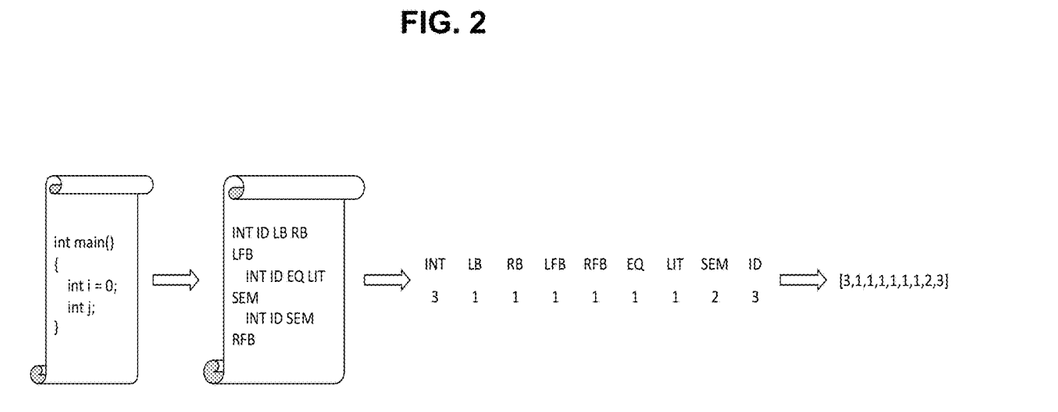
FIG. 2 depicts construction of an exemplary vector for a function (method) for a bag of words (BOW) algorithm, according to some embodiments of the disclosed invention.

FIG. 2 depicts construction of an exemplary vector for a function (method) for a BOW algorithm, according to some embodiments of the disclosed invention. In some embodiments, the vector for every violation is constructed by concatenation of the vector of the source code snipped containing the violation (created using BOW model) with the vector created from meta data information about the violation. As known in the art, the bag-of-words model is a simplifying representation used in natural language processing and information retrieval. In this model, a text (such as a sentence or a document) is represented as the bag (multiset) of its words, disregarding grammar and even word order but keeping multiplicity. In practice, the BOW model can be used as a tool of feature generation.

For example, after transforming a text into a "bag of words", one can calculate various measures or features to characterize the text. One type of characteristics, calculated from the BOW model is term frequency, namely, the number of times a term appears in the text. The comments in the source code are discarded, and all identifiers (names) such as functions, variables, constants, class names, etc. are encoded as the same token; all strings are encoded as the same token as well.

TABLE 2

| | |
|---|---|
| ; | 0 |
| *= | 1 |
| /= | 2 |
| %= | 3 |
| += | 4 |
| -= | 5 |
| / | 6 |
| * | 7 |
| ++ | 8 |
| -- | 9 |
| ( | 10 |
| ) | 11 |
| [ | 12 |
| ] | 13 |
| -> | 14 |
| ~ | 15 |
| ! | 16 |
| && | 17 |
| { | 18 |
| % | 19 |
| << | 20 |
| >> | 21 |
| <= | 22 |
| >= | 23 |
| < | 24 |
| > | 25 |
| == | 26 |
| != | 27 |
| ^ | 28 |
| \|\| | 29 |
| \| | 30 |
| ? | 31 |
| : | 32 |
| = | 33 |

TABLE 2-continued

| | |
|---|---|
| , | 34 |
| } | 35 |
| + | 36 |
| */ | 37 |
| = | 38 |
| , | 39 |
| # | 40 |
| + | 41 |
| */ | 42 |
| extends | 43 |
| final | 44 |
| finally | 45 |
| float | 46 |
| for | 47 |
| if | 48 |
| abstract | 49 |
| break | 50 |
| byte | 51 |
| case | 52 |
| catch | 53 |
| char | 54 |
| class | 55 |
| const | 56 |
| extends | 57 |
| do | 58 |
| implements | 59 |
| import | 60 |
| instanceof | 61 |
| try | 62 |
| void | 63 |
| while | 64 |
| new | 65 |
| package | 66 |
| private | 67 |
| continue | 68 |
| default | 69 |

Table 2 above illustrates an example of an encoding that is derived from the language grammar and that can be used to transform the source code into a BOW (first) vector. For example, all instances of the keyword 'char' are encoded into value 54. In the resulting BOW vector, the number of times the keyword 'char' is encountered will be written down in the position 54 of the resulting vector.

In some embodiments, the code snippets with violations are encoded into vectors using the BOW model. In the bag of words, every word from the dictionary, which is obtained from the grammar of the language by assigning every accepted sequence of tokens and keywords a position in the vector to which the number of occurrences of this token (keyword) is written. In some embodiments, these words are not weighted and the strings are replaced by a special token. The BOW is constructed using a table described above or a similar one.

Figure 3:
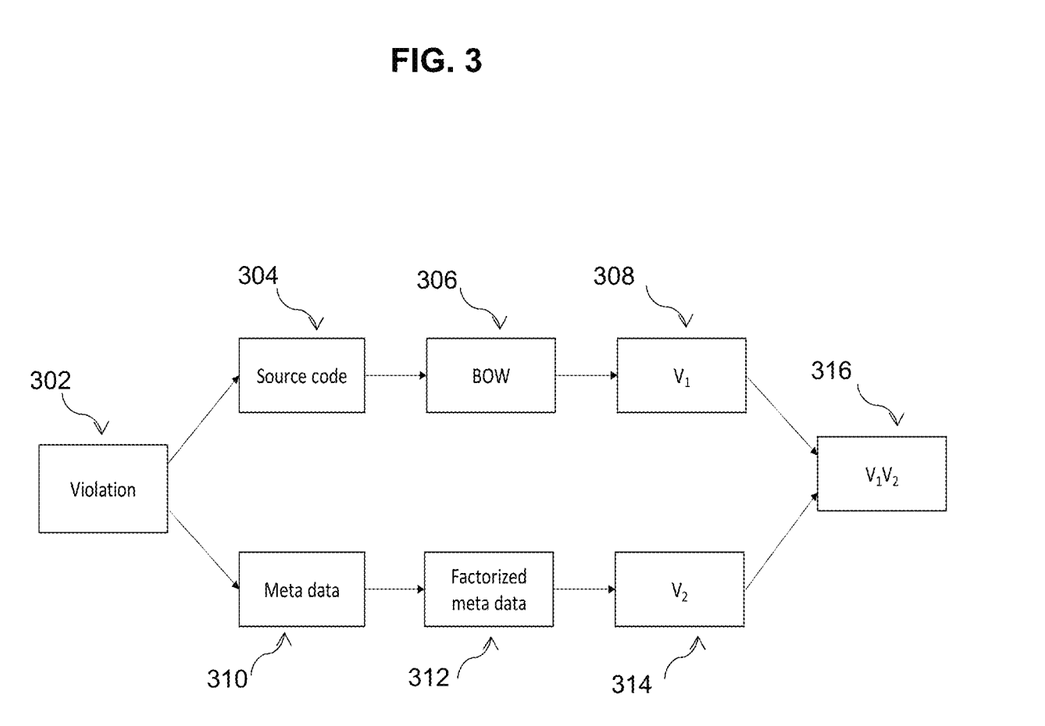
FIG. 3 illustrates a process for creating a vector representation (feature vector) of a single violation, according to some embodiments of the disclosed invention.

FIG. 3 illustrates a process for creating a vector representation (feature vector) of a single violation, according to some embodiments of the disclosed invention. As shown, a feature vector $V=V_1V_2$ is constructed from code snippet vector $V_1$ related to test violation, and then concatenated with a vector $V_2$ that is constructed from the meta-data associated with the test violation. The static analysis tool generates the report, which contains list of test violations $L_{1...n}$. The processes from blocks 302 to 316 are performed for each violation 1 . . . n from the test violation list $L_{1...n}$. In block 302, for each test violation i from test violation list $L_{1...n}$, the report contains: meta data $M_i$, and a link to source code snippet $S_i$ related to the test violation i.

Figure 6:
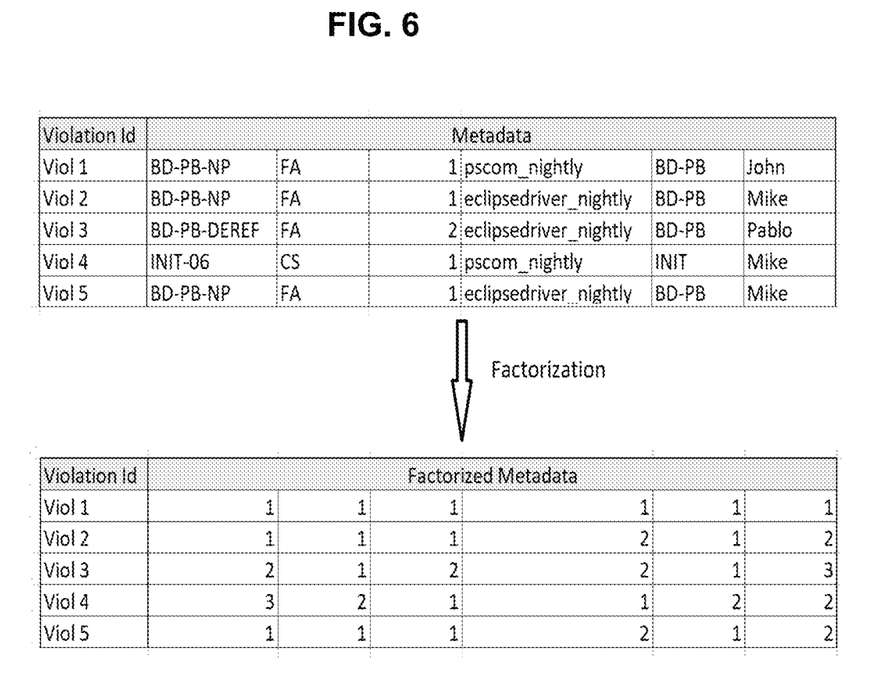
FIG. 6 depicts an exemplary process of meta data factorization for an exemplary list of violations, according to some embodiments of the disclosed invention.

The source code snippet $S_i$ related to the test violation i is extracted from repository of analyzed project, in block 304. In block 306, for violation i, the BOW processes source code snippet $S_i$, from list of violation $L_{1...n}$. For test violation i, vector $V_{i1}$ is created as the output of BOW, in block 308. This vector $V_{i1}$ is the feature vector of code snippet related to violation i. Meta data $M_i$ related to violation i is then extracted from report of list of violations $L_{1...n}$, in block 310. In block 312, for violation i, a factorization process is performed on meta data $M_i$. The factorization process encodes meta data objects as an enumerated type. FIG. 6 depicts an exemplary process of meta data factorization for an exemplary list of test violations.

In block 314, for violation i vector $V_{i2}$ is created as output of factorization algorithm. It is feature vector of meta data related to violation i. Feature vector $V_i$ for violation i is then constructed by concatenating vector $V_{i1}$ with vector $V_{i2}$, in block 316.

Figure 4:
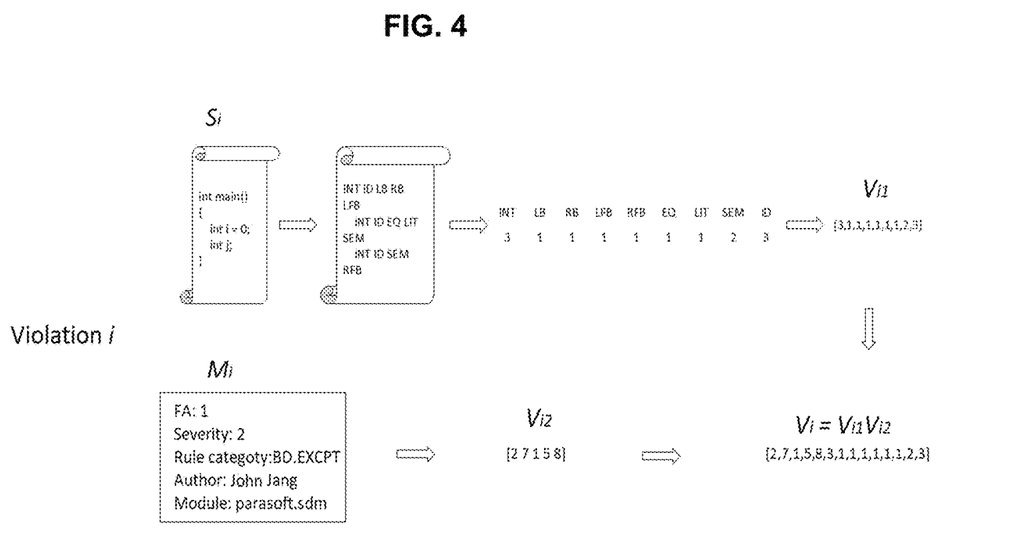
FIG. 4 depicts an exemplary process for construction of an exemplary vector representation for a test violation, according to process described in FIG. 3.

FIG. 4 depicts an exemplary process for construction of an exemplary vector representation for a test violation, according to process described in FIG. 3. Vector $V_i$ is constructed for a violation i, and includes meta data $M_i$ and source code snippet $S_i$ related to violation i. The source code of the snippet $S_i$ is lexed and transformed into a sequence of tokens, for example, according to Table 2. Lexer and parser creation list the resulting tokens, not as numbers, but as some abbreviation written in all capital letters, because the numbers representing particular tokens can change after the grammar is changed. FIG. 4 denotes integer numbers, for example, by INT, left round braces by LB, etc, because the exact numbers will vary between implementations. The number of occurrences of every token is then counted and saved to a vector $V_{i1}$, according to bag of words algorithm. The metadata $M_i$ is factorized by transforming every value in every column into a category and assigning every category an integer, resulting in vector $V_{i2}$. $V_{i1}$ and $V_{i2}$ are then concatenated to obtain the vector for violation.

Figure 5:
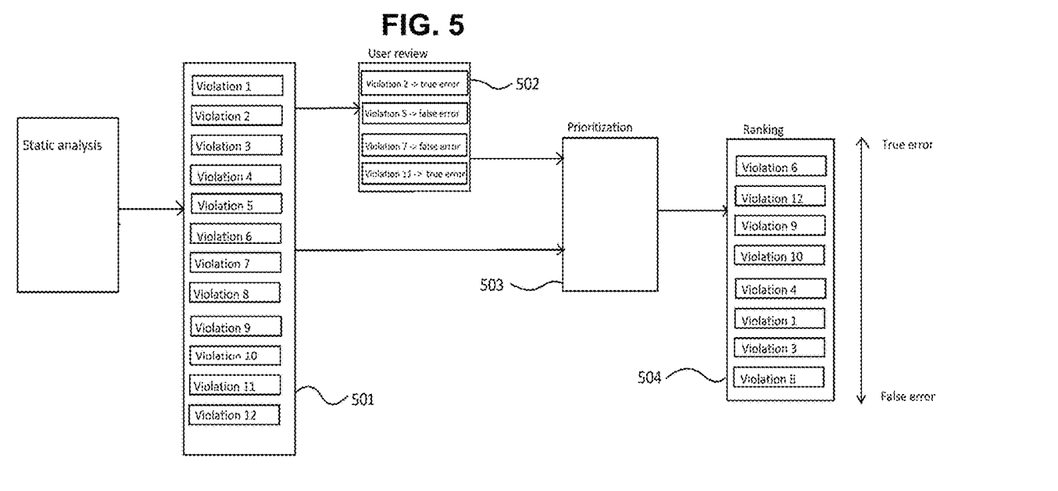
FIG. 5 depicts a process of prioritization for an exemplary list of violations, according to some embodiments of the disclosed invention.

FIG. 5 depicts a process of prioritization for an exemplary list of violations, according to some embodiments of the disclosed invention. As shown, a static analysis tool generates a report, which contains a list of violations 501. An exemplary list of violations is shown in Table 3 below. As shown in Table 3, every row contains the following information: the id of a violation (Viol 1), the static analysis rule associated with the violation (BD-PB-NP), the analysis type (FA), priority of this particular rule (1), the name of the build where this violation appeared (pscom_nightly), the flow analysis category (BD-PB), the author (e.g., John), and path to the source code (pscom/src/unix/debug/StackTrace.cc)

TABLE 3

| Violation Id | Metadata | | | | | | Path to source code related to violation |
|---|---|---|---|---|---|---|---|
| Viol 1 | BD-PB-NP | FA | 1 | pscom_nightly | BD-PB | John | pscom/src/unix/debug/StackTrace.cc |
| Viol 2 | BD-PB-NP | FA | 1 | eclipsedriver_nightly | BD-PB | Mike | cpp/cpptest/modules/eclipsedriver/driver.cc |
| Viol 3 | BD-PB-DEREF | FA | 2 | eclipsedriver_nightly | BD-PB | Pablo | cpp/cpptest/modules/eclipsedriver/driver.cc |
| Viol 4 | INIT-06 | CS | 1 | pscom_nightly | INIT | Mike | pscom/src/unix/os/ProcessImpl.cc |
| Viol 5 | BD-PB-NP | FA | 1 | eclipsedriver_nightly | BD-PB | Mike | cpp/cpptest/modules/eclipsedriver/driver.cc |
| Viol 6 | BD-RES-LEAKS | FA | 1 | eclipsedriver_nightly | BD-RES | Pablo | cpp/cpptest/modules/eclipsedriver/driver.cc |
| Viol 7 | BD-PB-CC | FA | 2 | eclipsedriver_nightly | BD-PB | Pablo | cpp/cpptest/modules/eclipsedriver/driver.cc |

TABLE 3-continued

| Violation Id | Metadata | | | | | | Path to source code related to violation |
|---|---|---|---|---|---|---|---|
| Viol 8 | BD-PB-NP | FA | 1 | cpptestdebug_nightly | BD-PB | John | cpp/cpptest/modules/cpptestdebug/src/Gcc.c |
| Viol 9 | BD-PB-NP | FA | 1 | cpptesttrace_nightly | BD-PB | John | cpp/cpptest/modules/cpptesttrace/src/unix/CppTestTrace.c |
| Viol 10 | BD-PB-NP | FA | 1 | eclipsedriver_nightly | BD-PB | Mike | cpp/cpptest/modules/eclipsedriver/driver.cc |
| Viol 11 | BD-PB-CC | FA | 2 | edgtk_nightly | BD-PB | Mike | cpp/edgtk/src/Tokens.cc |
| Viol 12 | BD-PB-NP | FA | 1 | eclipsedriver_nightly | BD-PB | Mike | cpp/cpptest/modules/eclipsedriver/driver.cc |
| Viol 13 | BD-PB-DEREF | FA | 2 | eclipsedriver_nightly | BD-PB | John | cpp/cpptest/modules/eclipsedriver/driver.cc |
| Viol 14 | BD-PB-NP | FA | 1 | eclipsedriver_nightly | BD-PB | Richard | cpp/cpptest/modules/eclipsedriver/driver.cc |
| Viol 15 | BD-PB-NP | FA | 1 | eclipsedriver_nightly | BD-PB | John | cpp/cpptest/modules/eclipsedriver/driver.cc |
| Viol 16 | BD-PB-NP | FA | 1 | eclipsedriver_nightly | BD-PB | Richard | cpp/cpptest/modules/eclipsedriver/driver.cc |
| Viol 17 | BD-RES-LEAKS | FA | 1 | javalauncher_nightly | BD-RES | Richard | cpp/cpptest/modules/javalauncher/src/Unix.cc |
| Viol 18 | BD-RES-LEAKS | FA | 1 | eclipsedriver_nightly | BD-RES | Richard | cpp/cpptest/modules/eclipsedriver/driver.cc |
| Viol 19 | BD-RES-LEAKS | FA | 1 | eclipsedriver_nightly | BD-RES | Richard | cpp/cpptest/modules/eclipsedriver/driver.cc |
| Viol 20 | BD-RES-LEAKS | FA | 1 | eclipsedriver_nightly | BD-RES | John | cpp/cpptest/modules/eclipsedriver/driver.cc |

In block 502, N random violations are analyzed, determined whether a particular violation is a true error or a false error (false positive), as shown in Table 4 below (last column).

TABLE 4

| Violation Id | Metadata | | | | | | Path to source code related to violation | User review |
|---|---|---|---|---|---|---|---|---|
| Viol 2 | BD-PB-NP | FA | 1 | eclipsedriver_nightly | BD-PB | Mike | cpp/cpptest/modules/eclipsedriver/driver.cc | true error |
| Viol 5 | BD-PB-NP | FA | 1 | eclipsedriver_nightly | BD-PB | Mike | cpp/cpptest/modules/eclipsedriver/driver.cc | false error |
| Viol 7 | BD-PB-CC | FA | 2 | eclipsedriver_nightly | BD-PB | Pablo | cpp/cpptest/modules/eclipsedriver/driver.cc | false error |
| Viol 11 | BD-PB-CC | FA | 2 | edgtk_nightly | BD-PB | Mike | cpp/edgtk/src/Tokens.cc | true error |

In block 503, a regressor machine learning software is trained on reviewed violations and the probabilities of true error are estimated for all remaining violations, as shown in Table 5 below (last column). In some embodiments, this process is repeated for every analyzed violation to improve the quality of the model and the predictions made by the model. In these embodiments, a regressor is a statistical model that is built as a result of solving an instance of a supervised learning problem, and that gives quantitative output ranging from 0 to 1. In some embodiments, a regressor that maps input features to interval [0 . . . 1], which is treated as a number representing probability, may be used. Considering two violations, $V_1$ with label 'false positive', which means its probability of being a true positive is 0, and $V_2$ with label 'true positive' has a probability=1. A linear function $f(X)=p$ is approximated by using the vectors for violations as input X and the probability p as the output. The resulting function is the statistical model (regressor). For every violation $V_i$, to estimate the probability of it being a true error, the value p is computed by substituting $f(V_i)=p_i$.

Referring back to FIG. 5, in block 504, the estimated probabilities of true error estimated for all remaining violations are presented to the user on a display screen. In some embodiments, the disclosed invention is a non-transitory computer storage medium for improving the test results of a static code analyzer. The storage medium, such as Random-Access Memory (RAM) or hard drive, includes a plurality of programing instructions that when executed by a computer perform the process of the disclosed invention.

FIG. 6 depicts an exemplary process of meta data factorization for an exemplary list of violations, according to some embodiments of the disclosed invention. The factorization process encodes meta data objects as an enumerated type. In some embodiments, the factorization is performed column-wise, for example, the column with authors. As shown in FIG. 6, there are three unique authors. Every unique value in a respective column is assigned a unique sequence number. Then, in every row, the value in the column is replaced with the sequence number for that value obtained in the previous step.

It will be recognized by those skilled in the art that various modifications may be made to the illustrated and other embodiments of the invention described above, without departing from the broad inventive scope thereof. It will be

TABLE 5

| Violation Id | Metadata | | | | | | Path to source code related to violation | True error probability |
|---|---|---|---|---|---|---|---|---|
| Viol 6 | BD-RES-LEAKS | FA | 1 | eclipsedriver_nightly | BD-RES | Pablo | cpp/cpptest/modules/eclipsedriver/driver.cc | 0.996 |
| Viol 12 | BD-PB-NP | FA | 1 | eclipsedriver_nightly | BD-PB | Mike | cpp/cpptest/modules/eclipsedriver/driver.cc | 0.992 |
| Viol 9 | BD-PB-NP | FA | 1 | cpptesttrace_nightly | BD-PB | John | cpp/cpptest/modules/ cpptesttrace/src/unix/CppTestTrac | 0.641 |
| Viol 10 | BD-PB-NP | FA | 1 | eclipsedriver_nightly | BD-PB | Mike | cpp/cpptest/modules/eclipsedriver/driver.cc | 0.523 |
| Viol 4 | INIT-06 | CS | 1 | pscom_nightly | INIT | Mike | pscom/src/unix/os/ProcessImpl.cc | 0.431 |
| Viol 1 | BD-PB-NP | FA | 1 | pscom_nightly | BD-PB | John | pscom/src/unix/debug/StackTrace.cc | 0.328 |
| Viol 3 | BD-PB-DEREF | FA | 2 | eclipsedriver_nightly | BD-PB | Pablo | cpp/cpptest/modules/eclipsedriver/driver.cc | 0.248 |
| Viol 8 | BD-PB-NP | FA | 1 | cpptestdebug_nightl | BD-PB | John | cpp/cpptest/modules/cpptestdebug/src/Gcc.c | 0.007 | understood therefore that the invention is not limited to the particular embodiments or arrangements disclosed, but is rather intended to cover any changes, adaptations or modifications which are within the scope of the invention as defined by the appended claims and drawings.

What is claimed is:

1. A computer-implemented method for improving test results of a static code analyzer, the method comprising: receiving a plurality of test violations from the static code analyzer; for each test violation received from the static code analyzer, encoding a function or method in which said each test violation is identified into a first vector including a link to a source code snippet in which said each test violation is identified; factorizing and transforming meta data for said each test violation into a second vector; concatenating the first vector with the second vector to produce a single feature vector for said each test violation; randomly selecting a predetermined number of test violations from the plurality of test violations; analyzing the selected test violations to determine whether they are true errors or false positives; using the single feature vectors for said each test violation and results of analyzing the selected test violations as input to a machine learning engine to produce a regressor; and obtaining probabilities of being a false positive or a true error, for every one of remaining test violations that have not been analyzed; and prioritizing the remaining test violations that have not been analyzed, based on their probabilities of being a false positive or a true error.

2. The method of claim 1, wherein encoding a function or method into a vector is performed using a bag of words (BOW) method.

3. The method of claim 1, wherein encoding a function or method into a vector is performed using a term frequency-inverse document frequency (TF-IDF), or neural network-based models.

4. The method of claim 3, wherein a feature vector for said each test violation is produced by: extracting a source code snippet Si related to test violation i from the analyzed test violations, wherein i is an integer greater than zero; for test violation i, processing the source code snippet $S_i$, from the list of test violations $L_{1 \ldots n}$; for test violation i, creating a vector $V_{i1}$ as the feature vector of source code snippet related to violation i; extracting the meta data $M_i$ related to test violation i from the list of the plurality of test violations $L_{1 \ldots n}$; for each violation i, performing a factorization process on the meta data $M_i$, wherein the factorization process encodes meta data objects as an enumerated type; for violation i, creating a vector $V_{i2}$ as an output of factorization process, as a vector of meta data related to test violation i; and producing a feature vector $V_i$ for test violation i by concatenating the vector $V_{i1}$ with the vector $V_{i2}$.

5. The method of claim 1, wherein the plurality of test violations from the static code analyzer includes for each test violation i from a list of a plurality of test violations $L_{1 \ldots n}$, meta data $M_i$, and a link to a source code snippet $S_i$ related to test violation i, wherein i is an integer greater than zero.

6. The method of claim 1, wherein a feature vector for said each test violation is produced by: extracting a source code snippet $S_i$ related to test violation i from the analyzed test violations, wherein i is an integer greater than zero; for test violation i, processing the source code snippet $S_i$, from the list of the plurality of test violations $L_{1 \ldots n}$; for test violation i, creating a vector $V_{i1}$ as the feature vector of source code snippet related to violation i; extracting the meta data $M_i$ related to test violation i from the list of the plurality of test violations $L_{1 \ldots n}$, for each violation i, performing a factorization process on the meta data $M_i$, wherein the factorization process encodes meta data objects as an enumerated type; for violation i, creating a vector $V_{i2}$ as an output of factorization process, as a vector of meta data related to test violation i; and producing the feature vector $V_i$ for test violation i by concatenating the vector $V_{i1}$ with the vector $V_{i2}$.

7. A computer-implemented method for improving test results of a static code analyzer, the method comprising: receiving a plurality of test violations from the static code analyzer; constructing a first vector for each source code snippet containing error candidates including a link to the source code snippet in which said each test violation is identified; constructing a second vector for each test violation from meta-data associated with said each test violation; merging the first vector with the second vector to produce a feature vector for each test violation; and applying statistical learning techniques to each feature vector to estimate a probability that an error candidate in the plurality of test violations is a true error or a false positive; and prioritizing each feature vector for each test violation based on their probabilities of being a false positive or a true error.

8. The method of claim 7, further comprising for each test violation received from the static code analyzer, encoding a function or method in which said each test violation is identified into the first vector.

9. The method of claim 8, wherein encoding a function or method into a vector is performed using a bag of words (BOW) method.

10. The method of claim 8, wherein encoding a function or method into a vector is performed using a term frequency-inverse document frequency (TF-IDF), or neural network-based models.

11. A non-transitory computer storage medium for improving test results of a static code analyzer having stored thereon a plurality of programing instructions that when executed by a computer perform:
receiving a plurality of test violations from the static code analyzer;
constructing a first vector for each code snippet containing error candidates including a link to said each code snippet in which said each test violation is identified;
constructing a second vector for each test violation from meta-data associated with said each test violation;
merging the first vector with the second vector to produce a feature vector for each test violation;
applying statistical learning techniques to each feature vector to estimate a probability that an error candidate in the plurality of test violations is a true error or a false positive; and
prioritizing the remaining test violations that have not been analyzed, based on their probabilities of being a false positive or a true error.

12. The non-transitory computer storage medium of claim 11, wherein the method further comprises: encoding a function or method in which said each test violation is identified into the first vector, for each test violation received from the static code analyzer.

13. The non-transitory computer storage medium of claim 12, wherein encoding a function or method into a vector is performed using a bag of words (BOW) method.

14. The non-transitory computer storage medium of claim 12, wherein encoding a function or method into a vector is performed using a term frequency-inverse document frequency (TF-IDF), or neural network-based models.

15. The non-transitory computer storage medium of claim 12, wherein the feature vector for said each test violation is produced by: extracting a source code snippet Si related to test violation i from analyzing a plurality of test violations, wherein i is an integer greater than zero; for test violation i, processing the source code snippet Si, from a list of a plurality of test violations $L_{1...n}$; for test violation i, creating a vector $V_{i1}$ as the feature vector of code snippet related to test violation i; extracting meta data Mi related to test violation i from the list of a plurality of test violations $L_{1...n}$; for each test violation i, performing a factorization process on the meta data Mi, wherein the factorization process encodes meta data objects as an enumerated type; for test violation i, creating a vector $V_{i2}$ as an output of factorization process, as a vector of meta data related to test violation i; and producing a feature vector $V_i$ for test violation i by concatenating the vector $V_{i1}$ with the vector $V_{i2}$.

* * * * *